United States Patent [19]
Vogel et al.

[11] Patent Number: 5,175,700
[45] Date of Patent: Dec. 29, 1992

[54] METHOD AND APPARATUS FOR SOLVING MULTIPLE EQUATIONS

[75] Inventors: Eric L. Vogel; Chris M. Bunsen, both of Corvallis, Oreg.

[73] Assignee: Hewlett-Packard Company, Palo Alto, Calif.

[21] Appl. No.: 645,953

[22] Filed: Jan. 25, 1991

[51] Int. Cl.⁵ ............................................. G06F 3/00
[52] U.S. Cl. ............................................. 364/710.11
[58] Field of Search ................... 364/706, 700, 709.01, 364/709.14, 735, 710.11

[56] References Cited

U.S. PATENT DOCUMENTS

| | | | |
|---|---|---|---|
| 4,647,911 | 3/1987 | Maegawa et al. | 364/709.14 |
| 4,803,463 | 2/1989 | Sado | 364/709.14 |
| 4,811,257 | 3/1989 | Sumitani et al. | 364/706 |
| 4,845,652 | 7/1988 | Bunsen | 364/709.14 |
| 5,020,012 | 5/1991 | Stockberger et al. | 364/709.14 |

Primary Examiner—Long T. Nguyen

[57] ABSTRACT

In a calculating device, a method and apparatus for representing to a user the state of variables in multiple equations to be solved. The representation in the present embodiment is through a user interface. The interface displays labels assigned to the variables within the multiple equations and indicates to the user on the label the state of each variable. These states are four: user-supplied values (U); calculator-supplied values (C); related values (R); and non-related values (N). Related values (R) are values that were used or solved for together in the latest solution of the equations. Through menu keys assigned to the variables represented by the labels, a user can supply or clear values for the variables for the next solution. The method also includes saving the order in which the variables are found and the order in which the equations are solved. This information allows the user to review the solution path followed by the calculating device in solving the multiple equations.

13 Claims, 8 Drawing Sheets

(▼ AS NEEDED)

[EQ+]

```
{ VCONE LCONE }
 VCONE: 'V=π*R^2*H/3'
 EQ: 'VCONE'
▶LCONE: 'L=√(R^2+H^2)'

[PLOTR][SOLVR][EQ+][EDIT][→STK][VIEW]
```

[MSOL]

```
L: 12

4:
3:
2:
1:
[ V ][ L ][ R ][ H ][   ][ALL]
```

5 [R] 12 [L]

[←] [ALL]

```
1:
[V=][L=][R=][H=][  ][ALL]
```

```
        EQ
V: 285.589415328
L: 12
R: 5
H: 10.9087121146
[V=][L=][R=][H=][  ][ALL]
```

| VALUE | NAME | USER SUPPLIED | | CALCULATOR SUPPLIED | |
|---|---|---|---|---|---|
| | | USED IN SOLUTION | NOT USED IN SOLUTION | SOLVED FOR | NOT SOLVED FOR |
| 5 | R | ✔ | ✔ | | |
| 12 | L | ✔ | ✔ | | |
| 285.58.. | V | | | ✔ | ✔ |
| 10.90.. | H | | | ✔ | ✔ |
| | | | | | |

FIG. 8B

| | VAR. BEING SOLVED FOR | EQUATION USING VAR |
|---|---|---|
| 1 | V | 1 |
| 2 | H | 2 |
| ⋮ | | |
| j | | |

FIG. 8C j — CURRENT VARIABLE WITHIN EQUATION i — CURRENT EQUATION

FIG. 8D

EQUATIONS 1, 2, 3, ⋮, i

METHOD AND APPARATUS FOR SOLVING MULTIPLE EQUATIONS

BACKGROUND OF THE INVENTION

This invention generally relates to method and apparatus for assisting a user in the process of solving multiple equations sharing common variables. More particularly, this invention relates to a method for representing to a user the state of variables in multiple equations to be solved.

The ability to solve an equation for an unknown is a powerful tool of newer computing devices such as calculators and computers. When such a tool is applied to an actual problem, the problem is often best represented as a set of multiple equations. For simple problems with few equations and variables, a user chooses one equation, puts in values that he knows and solves for an unknown. He then use the result of the first equation to solve for an unknown in a second equation and so forth. Ultimately this solution process leads to a value for a particular variable of interest.

For more complex problems, however, the number of equations and variables to be determined is large and the solution process becomes tedious. The user must keep track in each step for each variable whether it is known, unknown, or calculated. It also becomes difficult to select the proper equation in sequence to lead to a value for the desired variable. And once the solution is complete, it is difficult to identify which variables have related values and which do not.

Prior attempts to solve the difficulties of equation selection, variable tracking and variable identification have largely been manual in nature. Some have employed numerical root finders for the actual solving operation for each equation. Others have employed calculator or computer-based methods that automate the select-and-solve portion. But none of these prior attempts has provided a user with a visual indication of the state of a variable and its relationship to the other variables in the set of equations after solution of the equation.

SUMMARY OF THE INVENTION

An object of the invention, therefore, is to provide a method and apparatus for solving multiple equations which overcome the drawbacks of prior approaches.

A second object of the invention is to create a user interface that allows a user to easily enter known variables and solve for unknown variables.

A third object of the invention is to provide a visual indication to a user of the relationship among variables in multiple equations.

In accordance with these objects, a method of representing to a user the state of variables in multiple equations is disclosed. In the method, each of the multiple equations is scanned to find the variables in the equations. Each variable is then assigned a data entry point such as a key on a keyboard. A label for each variable is then displayed, and indicated on the label is the state of its variable. In the present embodiment, the state of a variable represented by a label is indicated by the color and pattern of the label.

In accordance with the invention, the order in which the variables are found and in which the equations are solved is determined. This information allows the user to review the solution path followed in solving the multiple equations.

BRIEF DESCRIPTION OF A PREFERRED EMBODIMENT

The Apparatus

Figure 1:
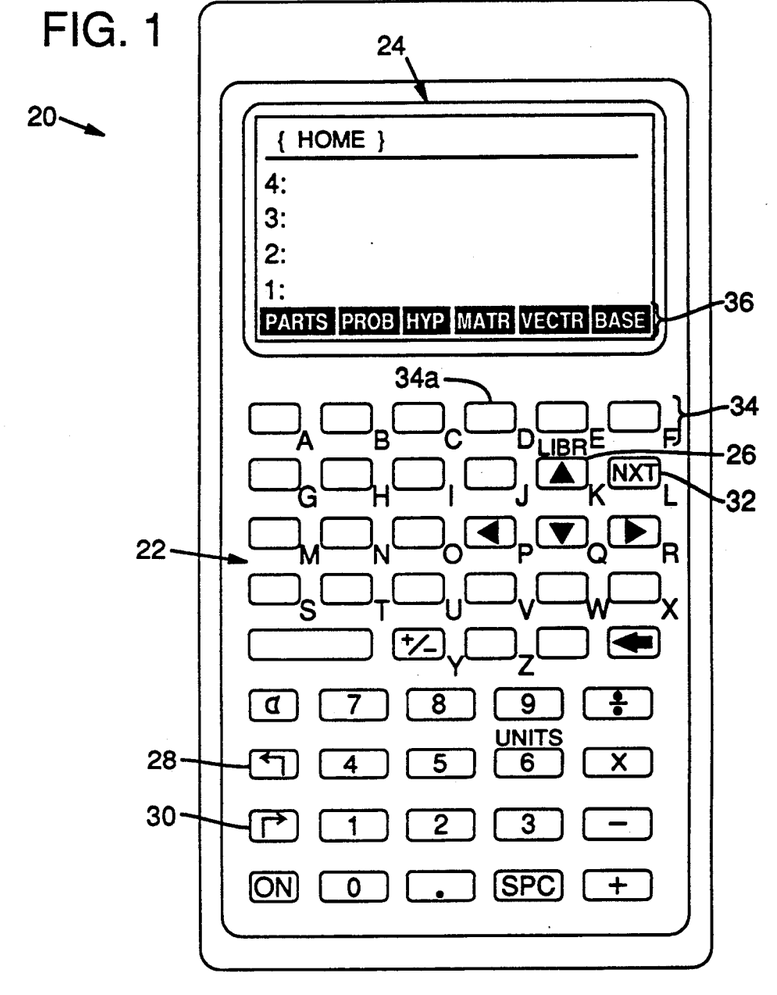
FIG. 1 is a pictorial view of a calculator as one embodiment of apparatus programmed according to the invention.

FIG. 1 shows a calculator 20 which is programmed to solve multiple equations according to the invention. The hardware and architecture of the calculator 20 (shown in FIG. 2) may be of conventional design. The calculator includes an entry means such as a keyboard 22 and a display means such as an LCD display 24. On the face of the keyboard are a plurality of keys that each have a number of functions. Relevant to the present invention are several of the keys that have unique functions. A LIBRARY key 26 is used for activating a multiple equation solver menu interface in a shifted operation. The shift is accomplished by first pressing the left shift key 28. Other keys of note include a right shift key 30, a NXT key 32, and a row of menu keys 34. In response to activating the solver menu, the menu keys are assigned to labels 36 that appear at the bottom of display 24, as will be further described hereafter.

Figure 2:
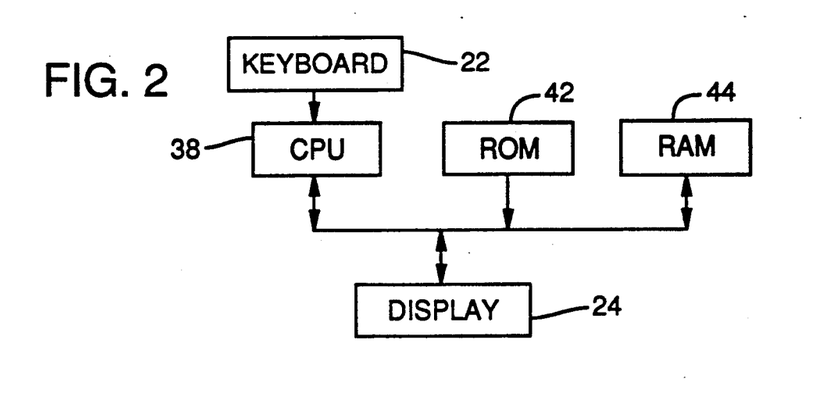
FIG. 2 is a block diagram of the architecture of the calculator of FIG. 1.

The architecture of calculator 20 includes a central processing unit (CPU) 38 to which are connected via various buses the keyboard 22, the display 24 and memory in the form of ROM 42 and RAM 44. The instructions for operating the CPU are written and stored in the ROM 42 in a conventional manner. The RAM 44 is available for storing data entered via the keyboard 22 and generated by the CPU 38 in the process of solving multiple equations according to the invention.

Of course, any equivalent calculating device may be used, such as a general purpose computer. Equivalent to the keyboard would be any data entry device such as a mouse. Equivalent to the LCD display would be any type of display device such as a CRT, hard copy device, etc.

The Multiple Equation Solver

The method of the present invention solves multiple equations for one or more variables and indicates to the user the state of the variables in the equations after each solution. These states are four: user-supplied values (U); machine-supplied values (C); related values (R); and non-related values (N). Related values are values that were used or found together in the latest solution of an equation. To assist a user in identifying the states of different values, a user interface as shown in FIG. 3 is provided.

Figure 3:
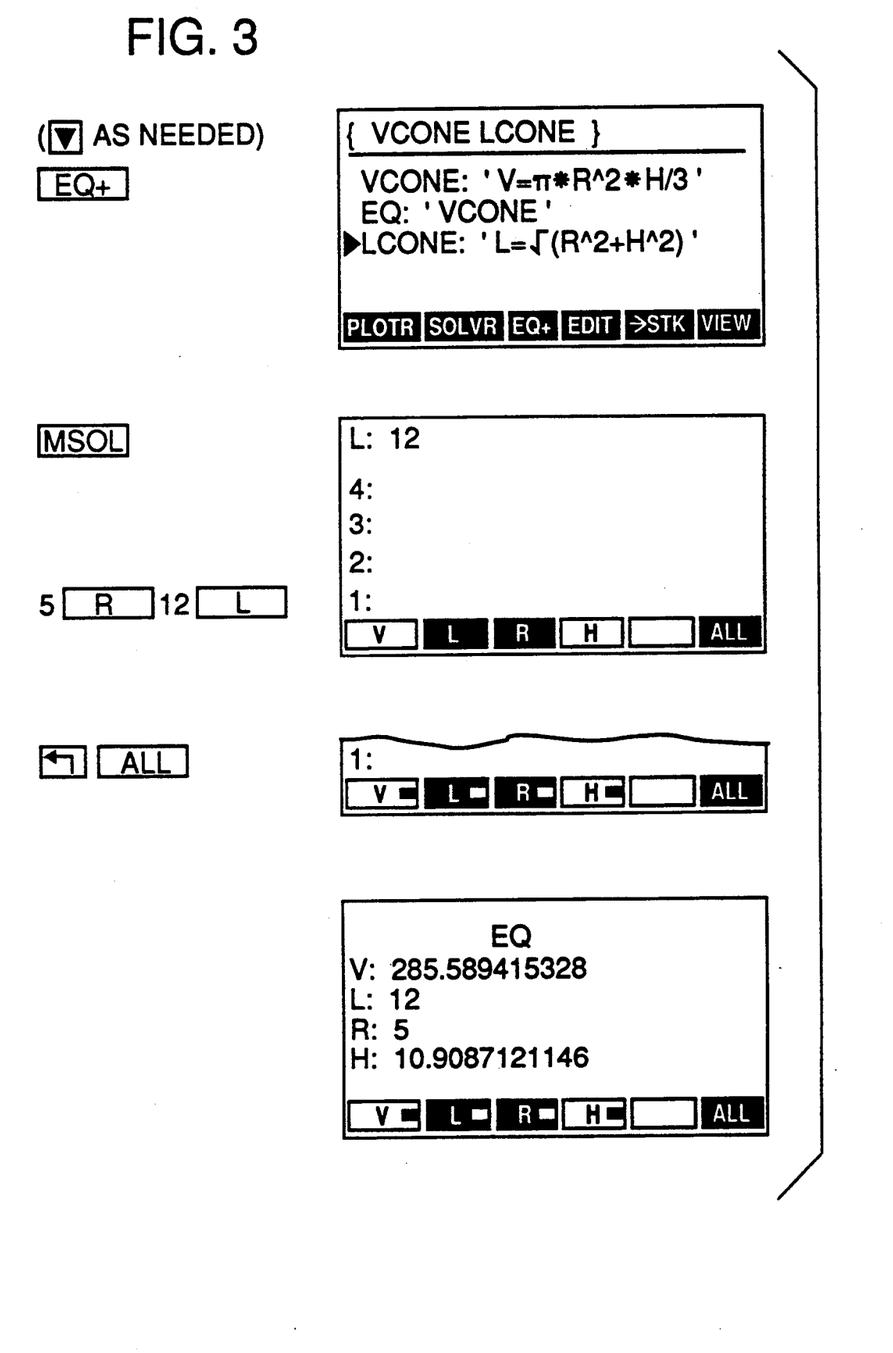
FIG. 3 is a series of screen displays illustrating a user interface according to the invention.

FIG. 3 is a series of screen displays illustrating the user interface as it appears on the display 24. The top screen display shows a list of two equations to be solved, VCONE and LCONE. The equations on the list may either come from a library of standard equations or be entered by the user separately. The next screen display shows the entry of two user supplied values, five for the variable R and twelve for the variable L. These variables are considered "known." At the bottom of the display 24, a row of labels 36 then appears, one label for each variable in the multiple equations. If more variables existed than could be shown in a single row, additional rows are created and can be brought into display by pressing the NXT key 32. The labels are assigned to menu keys 34 for selecting which variables are to be found in solving the equations. The background color of the label indicates the source (state) of the value of the associated variable. A black background, as for labels L and R, indicates that the value is user-supplied. A white background, as for labels V and H, indicates that the value is or will be machine (calculator) supplied. These variables are considered "unknown" until a value is calculated for each. The last label in the row is ALL and is selected for finding all the unknown variables. Thus in this example the user has the option of finding the values of H or V individually by pressing the assigned menu key or as a group by pressing the key 34 assigned to ALL.

The third screen display shows additional indicators on the labels 36 for indicating whether the values of the variables are related through the solving of the equations. That is, the indicators, which appear as black or white boxes within each label, indicate whether the variable was involved in the latest solution of the equations. Black boxes in a white label indicate the variable was calculated. White boxes in a black label indicate the variable was used. If a variable label does not have a black box in the third screen display, then the variable's value was not recently calculated or played no role in solving the equations. For example, if it is desirable to find only the value of the variable H, this can be done by employing only the equation LCONE. The variable V is not involved, and its label would not include a box after the computation. This tells the user that the value of V is not related to the values of the other variables.

The last screen display shows the values found for each variable. L and R were user supplied and thus are considered known. V and H were solved for using the supplied values for L and R and the two equations LCONE and VCONE. Table I, below, summarizes the key action, label appearance and effect on variable state for the interface:

TABLE I

| Variable State/ Key Definition | Appearance/Action | State Abbrev. |
|---|---|---|
| User-supplied values | Black key label | U |
| Calculator-supplied values | White (outline) key label | C |
| Related Values | Block in menukey label | R |
| Non-related values | No block in menukey label | N |
| menukey action | Store value in var | |
| left-shift menukey action | Solve for var | |
| right-shift menukey action | Recall var | |
| Blank memkeys | White (outline) keys | |

TABLE I-continued

| Variable State/ Key Definition | Appearance/Action | State Abbrev. |
|---|---|---|
| ALL key | Sets all keys to CN | |
| left ALL | Starts entire solution | |
| right ALL | Shows review of solution | |

The method of the present invention of representing to a user the state of a variable in multiple equations to be solved in particularly described in the pseudocode that appears in Appendix I. A more general description of the method is illustrated in the flowcharts of FIGS. 4-7, which will now be described. Each step of the method as it appears in a flowchart is indicated herein by an identifying numeral in parentheses.

Figure 4A:
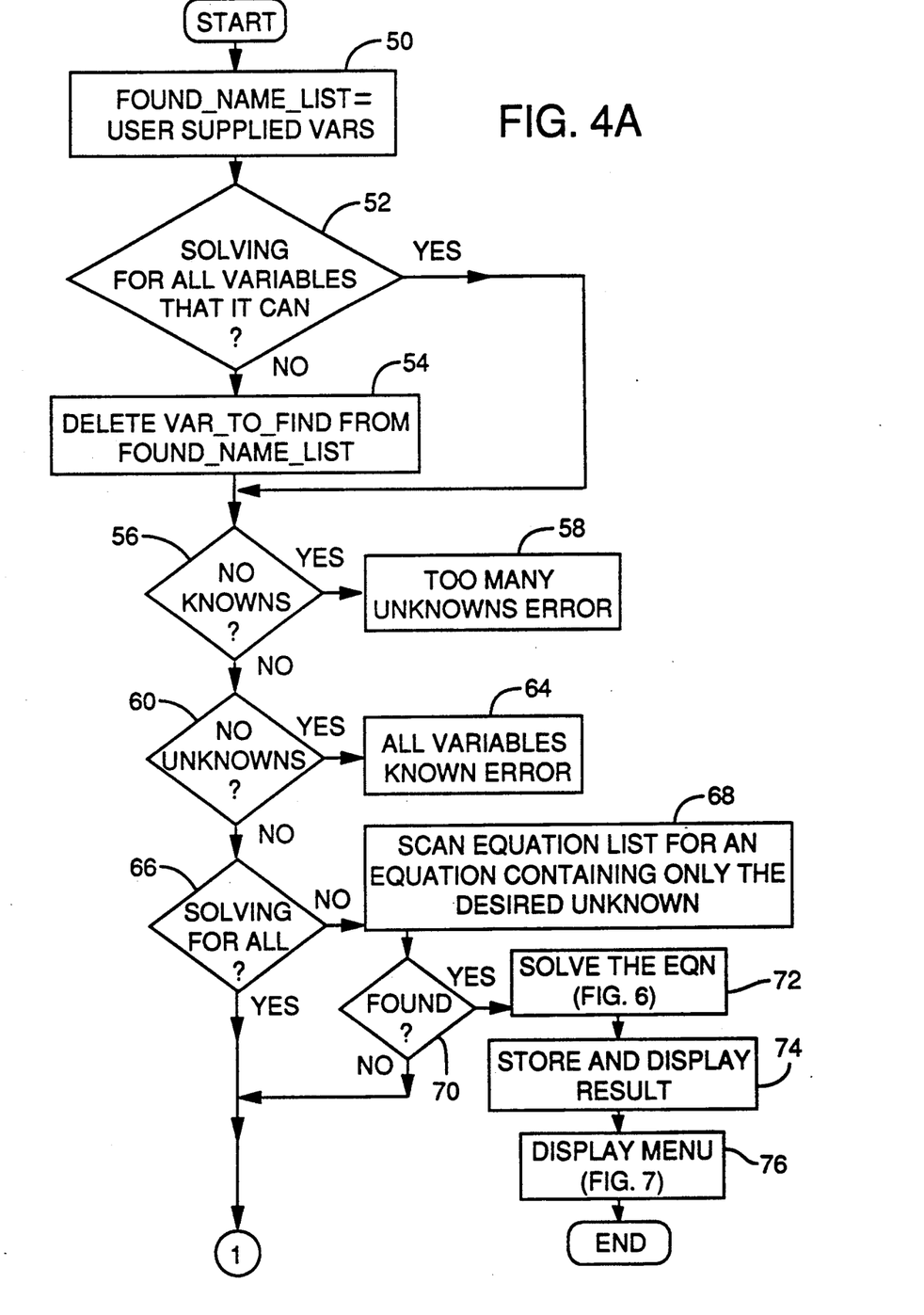
FIGS. 4A-B are portions of a flowchart illustrating the overall method of solving for variables in multiple equations in accordance with the invention.
Figure 4B:
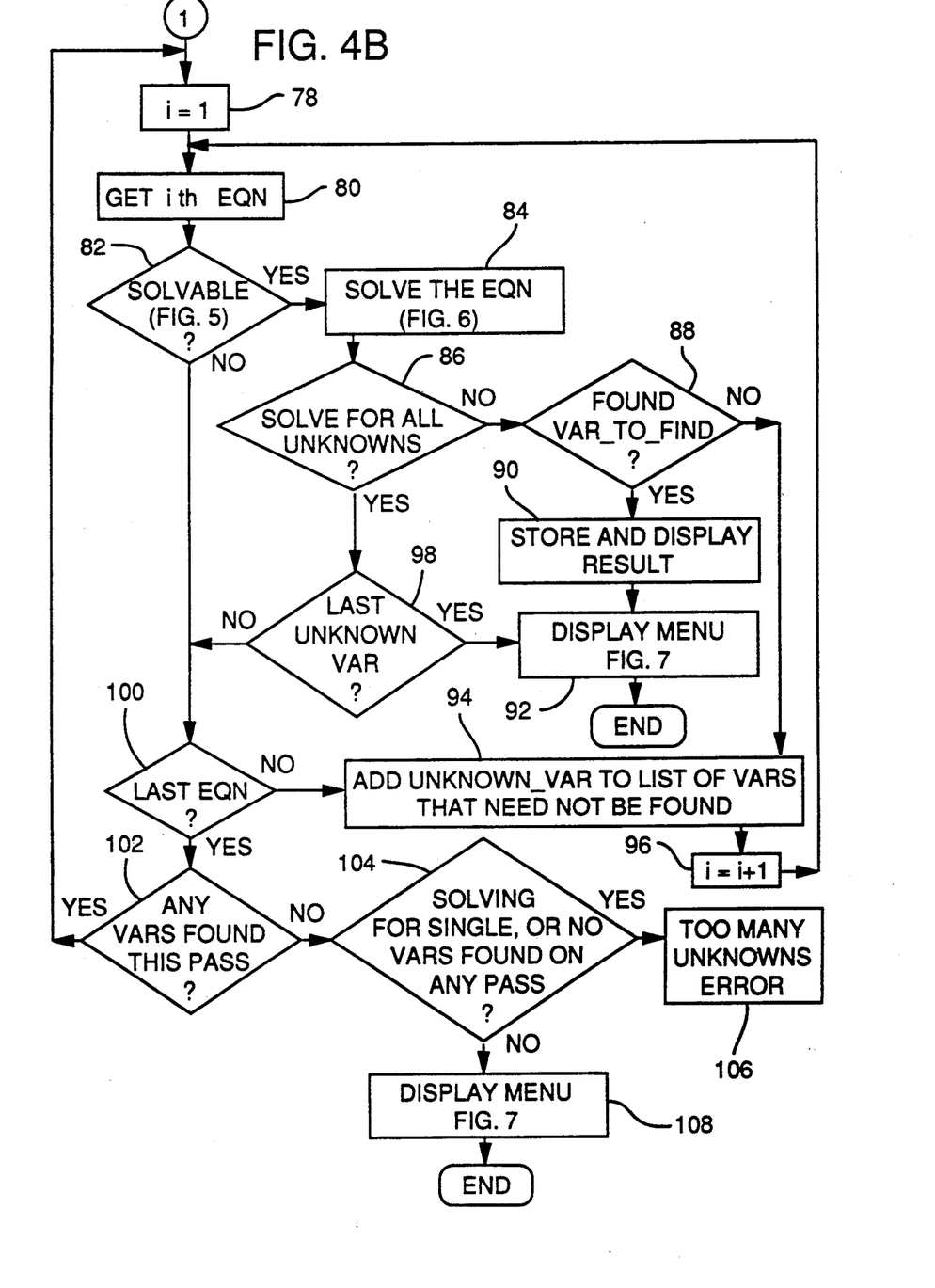

FIGS. 4A-B are portions of a flowchart illustrating the overall method for solving for variables in multiple equations. The beginning of the flowchart corresponds to the second screen display of FIG. 3, wherein the user supplied variables have been entered (50). The user first decides whether a specific variable or all of the variables is to be found (52). If only a specific variable (such as V in FIG. 3) is the object, then that variable is deleted from the found_name_list (if it were on it), because its value is to be found regardless of whether the user supplied a value (54). The equations are then checked to see if there are any known variables (56), and if not, an error signaling that there are too many unknown variables is displayed (58). Following is a check to see if there are any unknown variables (60), and if not, another error signaling that there are no unknown variables to be found is displayed (64). Assuming no error signal, the method checks again if it is solving for all unknown variables (66).

Figure 6:
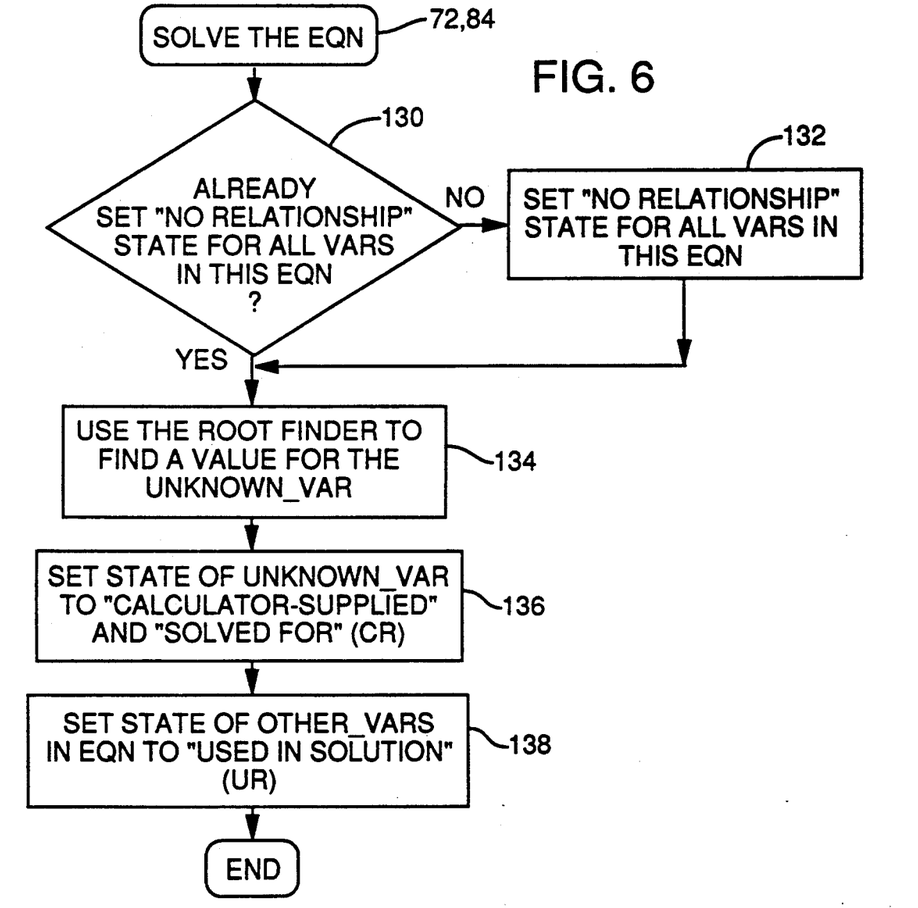
FIG. 6 is a flowchart of a method for solving an equation within the multiple equations.
Figure 7:
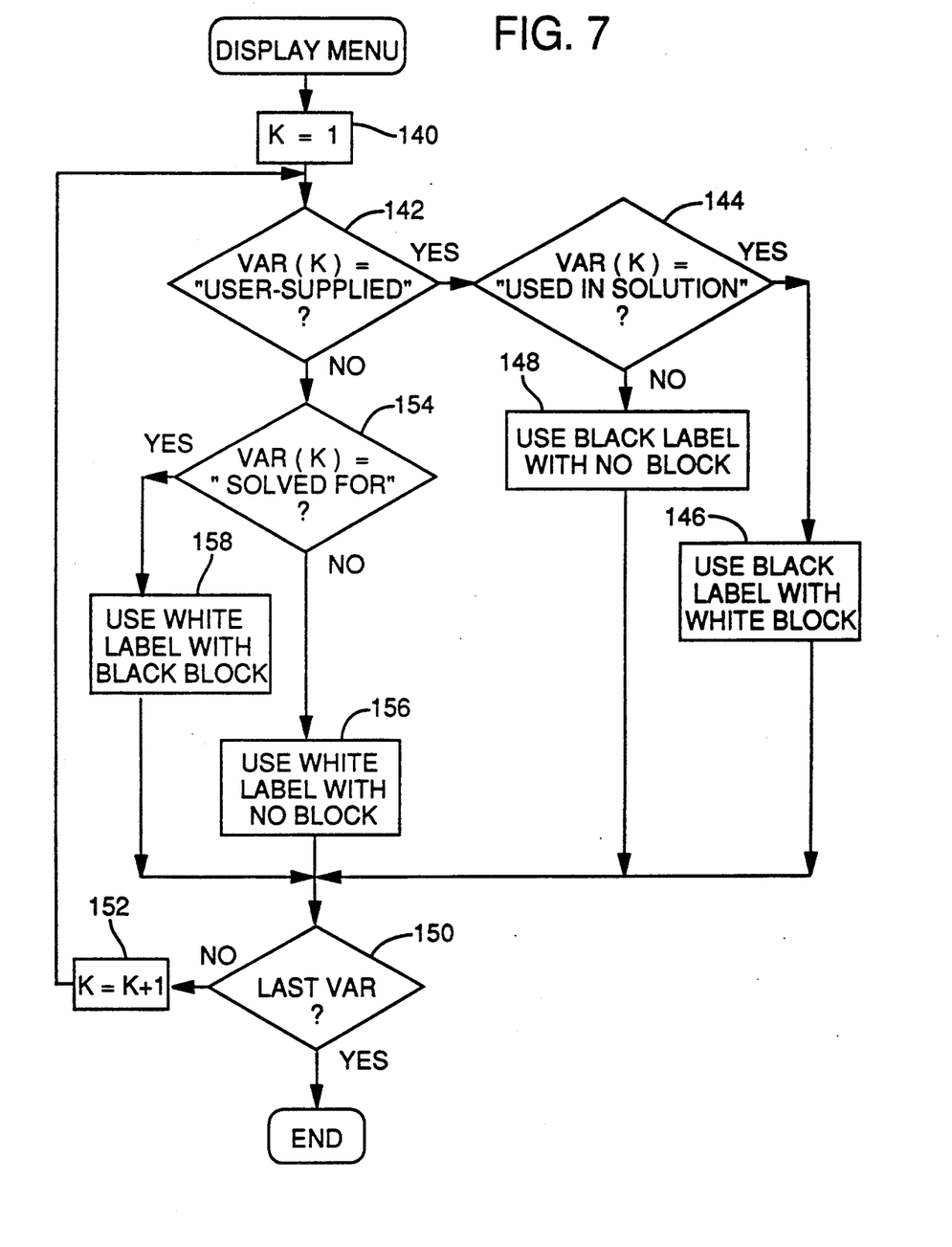
FIG. 7 is a flowchart of a method for displaying to a user the state of each variable within the multiple equations.

For the case where only a specific variable is to be found, the method scans the list of multiple equations for an equation containing only the desired unknown, such as V (68). If such an equation is found to exist (70), the equation is solved (72). The result for the variable is then stored and displayed (74) and the menu of FIG. 3 indicating the state of each variable in the multiple equations is displayed (76). The process for solving an equation is illustrated in FIG. 6 and the process of displaying the menu is illustrated in FIG. 7, both of which are described hereafter.

Figure 5:
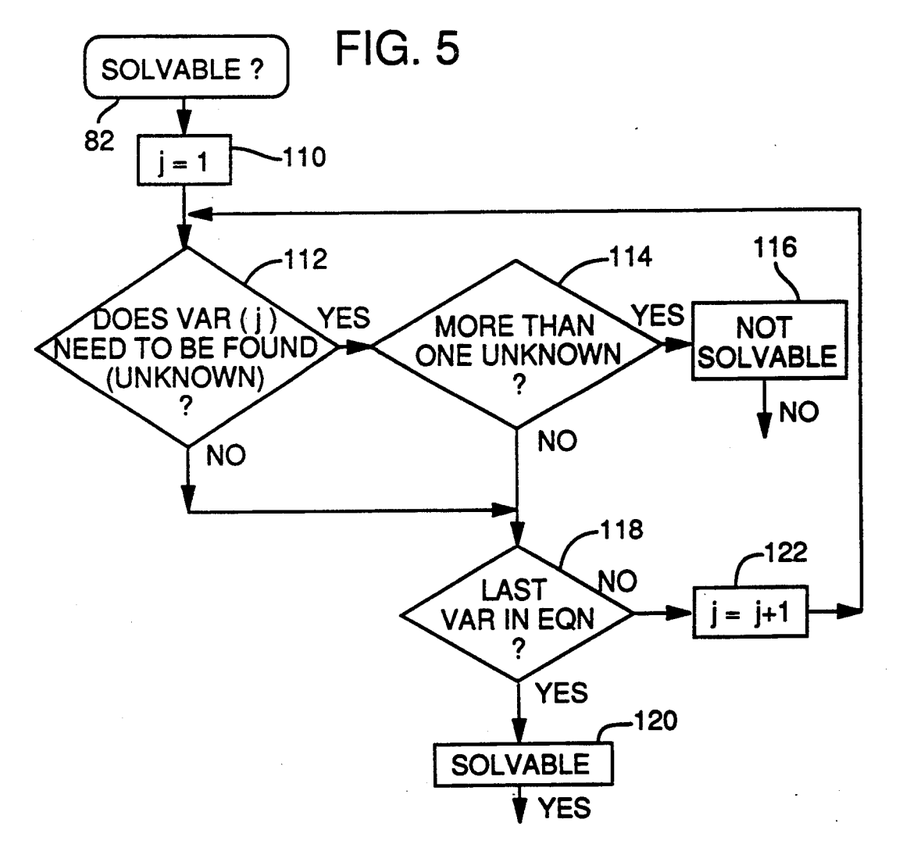
FIG. 5 is a flowchart of a method for determining if an equation within the multiple equations at a given point may be solved.

If no equation is found that contains only the desired unknown (68), then the method proceeds as though all variables are to be found, as shown at the bottom of FIG. 4A, which continues onto FIG. 4B. A counter i is then initialized for solving each of the equations on the list (78). The first equation is retrieved (80) and examined to determine if it is solvable (82). FIG. 5 illustrates the process for determining if the ith equation is presently solvable and is described hereafter. If the equation is solvable, then it is solved (84). With the equation solved, the method checks if all unknown variables are to be solved for (86). If not, it is then determined if the variables to be found have all been found (88). If so, then the variables are stored and displayed (90) and the menu indicating the state of each variable is also displayed (92). If there are other variable to be found at step (88), then the found variable is added to list of variables than need not be found (94), the i counter is incremented (96) and the next equation is retrieved from the equation list (80).

Returning to step (86), if all unknown variables are to be solved for, the method checks if the present variable is the last unknown (98). If so, then the solutions are complete and the menu is displayed (92). If there are other unknown variables still present, however, then the method checks if the ith equation is the last equation on the list (100). If not, then the variable is added to the list of variables that have been found (94). If, on the other hand, this is the last equation on the list, then the method inquires whether any variables were found on this pass through the i loop (102). If yes, then the i counter is reinitialized and the process repeats (78). If no variables are found on this pass, then the method determines if it is solving for a single variable or if no variables were found at all when solving for all variables (104). If so, then there are still too many unknown variables (106), and the error is signaled to the user. If not, then all variables have been found that can be found, and the menu indicating the state of each variable is displayed (108).

Referring now to FIG. 5, determining whether the ith equation is solvable begins by initializing a counter j for the variables in the equation (110). The variable is then examined to determine if it needs to be found, i.e., if it is an unknown (112). If it is, the ith equation is examined to determine if there are other unknown variables present in the equation (114). If that is the case, then the ith equation presently is not solvable (116), answering the question in the negative posed in step (82). If the ith equation has only the one unknown (114) to this point, then it must be determined if the jth variable in the ith equation is the last to be examined (118). If so, then the ith equation is deemed solvable (120), answering the question in the affirmative posed in step (82). If the variable is not the last in the ith equation, then the counter j is incremented (122) to the next variable and step (112) is again undertaken. If the jth variable need not be found, because it may have been user-supplied or not requested, then the method branches to step (118) and proceeds as described above.

The step of solving an equation which appears in FIG. 4A as step (72) and in FIG. 4B as step (84) is shown in detail in FIG. 6. Any preexisting relationship among the variables in the equation being solved is first cleared (130,132). Such a relationship may have existed from an earlier solution where the value of one variable was determined from values of one or more others. A root finder algorithm is then utilized to find a value for the unknown variable (134). Such algorithms are well known in the art, such as described in U.S. Pat. No. 4,845,652, which is hereby incorporated by reference. The state of the unknown variable is then set to "calculator supplied" and "solved for" (CR) in the present equation (136). The states of the other variables in the equation are then set to "used in the solution" (UR) (138). This completes the equation solving step, and the overall method proceeds therefrom.

The step of displaying the variable menu, which appears FIGS. 4A and 4B, is shown in detail in FIG. 7. The variable counter k is first initialized (140) and the state of the first variable is examined to determine if it is "user-supplied" (142). If so, then the kth variable is examined to determine if it was used in the solution of the equation(s) (144). If the variable was used in the solution, then a black label with a white block (indicating that state) is displayed above the menu key 34 assigned to the label (146). If it was not used in the solution but was user-supplied, a black label (indicating state) is displayed above the menu key 34 assigned to the variable represented by the label (148). In either case, the process then checks if there are other variables in the equations to be displayed (150) and, if so, increments the variable counter k (152).

Returning to step (142), if the variable is not "user-supplied," then it is examined to determine if it was "solved for" in the solution to the equation (154). If not, then the variable was not involved in the solution process. This may occur where the user has sought to find only specific variables rather than all of those present in the list of equations. In this case, a white label (indicating that state) is displayed above the menu key 34 assigned to the variable represented by the label (156). If, on the other hand, the variable was "solved for," then a white label with a black block (indicating that state) is displayed above the menu key 34 assigned to the variable represented by the label (158).

Figure 8A:
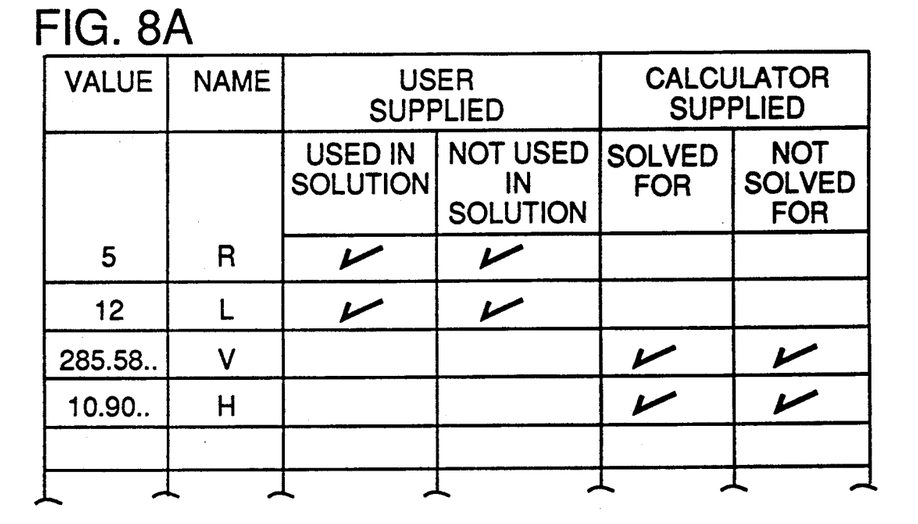
FIGS. 8A-D illustrate how variables and equations are stored in memory according to the invention.

FIGS. 8A-D illustrate functionally how the variables and equations are stored within the calculating device. In FIG. 8A, each variable is stored with its value, name, and state, with the variables shown in FIG. 3 entered for example. These states, as mentioned above, are four: user-supplied values (U); calculator-supplied values (C); related values (R); and non-related values (N). The first column under "user-supplied" is for indicating whether the variable was user supplied. The second column is for indicating whether the user-supplied variable was used in the last solution to the equations. The first column under "calculator supplied" is for indicating if the value was calculator or machine supplied. The second column is for indicating whether the calculator supplied variable was solved for in the last solution to the equations. The actual representation of this information in memory, of course, may be quite different from the illustration.

Figure 8B:
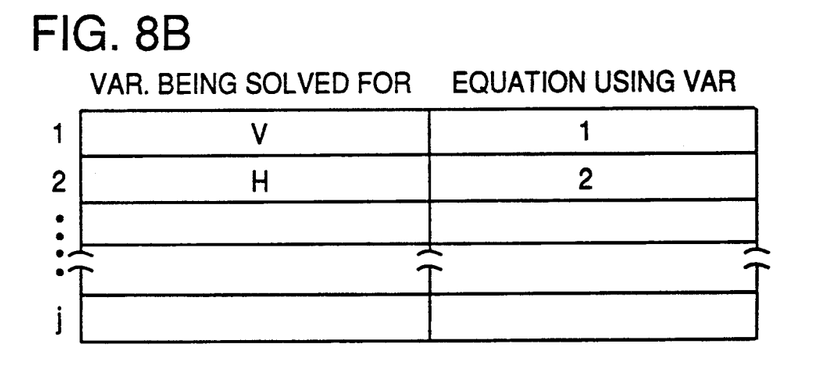
Figure 8C:
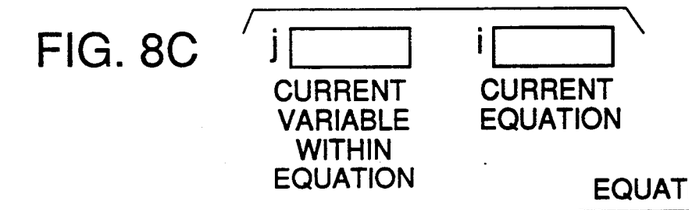
Figure 8D:
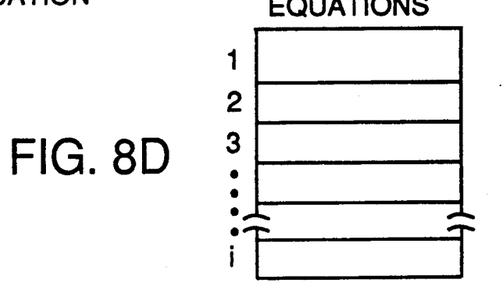

FIGS. 8B and 8D illustrate how the orders of solution of the variables and equations are saved in memory for later examination by a user. The values found for unknown variables may differ, depending on the order in which the root finder solves equations. As part of the method for solving the multiple equations herein, the orders in which the variables are found and equations solved are saved and may be recalled by the user through appropriate commands to the calculating device. The order shown is chronological, though other orders may be used as well. This information on orders of solution allows a user to determine the path taken by the multiple equation solver in solving the equations.

FIG. 8C illustrates a register within the calculating device for tracking the ith equation and jth variable as part of the method herein. Each equation and variable is stored in its order of solution, as shown in FIGS. 8B and 8D.

Having illustrated and described the principles of the invention in a preferred embodiment, it should be apparent to those skilled in the art that the invention can be modified in arrangement and detail without departing from such principles. We claim all modifications coming within the spirit and scope of the following claims.

We claim:

1. In a calculating device including a display and data entry device, a method of representing to a user a state of variables in multiple equations to be solved, comprising:

scanning each of several multiple equations sharing common variables to find the variables within the equations;

assigning to each variable a data entry point for a data entry device;

displaying a label associated with each variable; and

2. The method of claim 1 including indicating whether the value of the variable was involved in a last solution to the multiple equations.

3. The method of claim 1 including indicating whether the value of the variable was not involved in a last solution to the multiple equations.

4. The method of claim 1 including indicating whether the value of a user-supplied variable was used in a last solution to the multiple equations.

5. The method of claim 1 including indicating whether the value of a user-supplied variable was not used in a last solution to the multiple equations.

6. The method of claim 1 including indicating whether the value of a calculating device-supplied variable was solved for in a last solution to the multiple equations.

7. The method of claim 1 including indicating whether the value of a calculating device-supplied variable was not solved for in a last solution to the multiple equations.

8. The method of claim 1 including defining a value for a variable by selecting a value and then selecting the data entry point to which the variable is assigned, the label for the variable indicating in response that the variable value is user supplied.

9. The method of claim 1 wherein the data entry device comprises a keyboard and a data entry point comprises a key on the keyboard.

10. A calculating device comprising:

a display;

a data entry device for entering multiple equations that include common variables and for entering values for the variables into the calculating device;

a processing unit for:

scanning each of the entered multiple equations to find the variables within the equations;

assigning a data entry point to each variable;

displaying on the display a label associated with each variable; and indicating with each label whether a value of the associated variable is supplied by a user or is supplied by the calculating device.

11. The calculating device of claim 10 wherein the processing unit indicates with each label whether the value of its variable was used in a last solution to the multiple equations.

12. The calculating device of claim 10 wherein the processing unit indicates with each label whether the value of its variable was solved for in a last solution to the multiple equations.

13. A calculating device comprising:

(a) a display;

(b) memory;

(c) a plurality of keys for entering an equation that includes variables and for entering values for the variables into the memory; and (d) a processing unit for:

scanning the equation to find the variables within the equation;

assigning a key to each variable;

displaying a label on the display associated with each variable in proximity to the key to which the variable is assigned; and indicating on each label whether a value of the associated variable is supplied by a user or is supplied by the calculating device.

* * * * *